Feb. 1, 1949.  F. J. DOUGLASS  2,460,412
APPARATUS FOR FLAME CUTTING
Filed Oct. 7, 1942  3 Sheets-Sheet 1

Inventor
Frank J. Douglass
By Lyon & Lyon
Attorneys

Feb. 1, 1949. F. J. DOUGLASS 2,460,412
APPARATUS FOR FLAME CUTTING
Filed Oct. 7, 1942 3 Sheets-Sheet 2

Inventor
Frank J. Douglass
By Lyon & Lyon
Attorneys

Feb. 1, 1949.　　　　　F. J. DOUGLASS　　　　　2,460,412
APPARATUS FOR FLAME CUTTING
Filed Oct. 7, 1942　　　　　　　　　　　　　　3 Sheets-Sheet 3
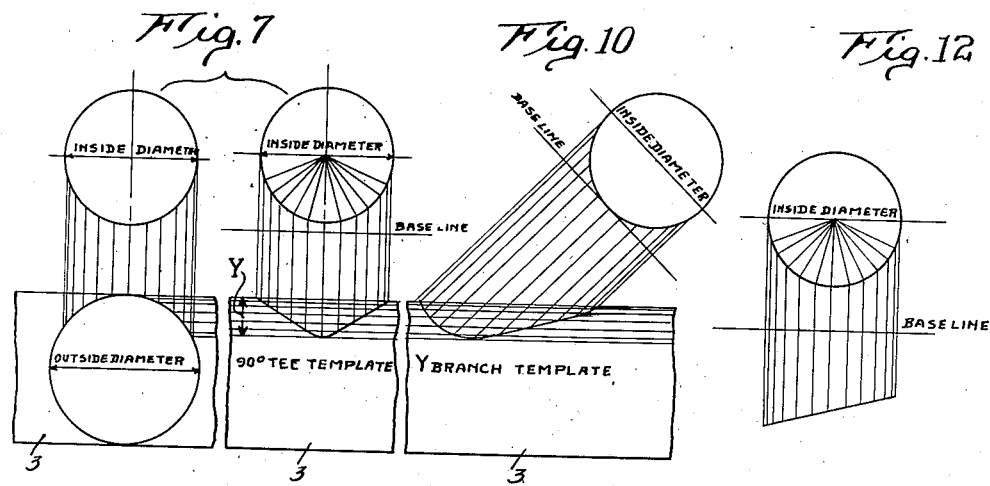
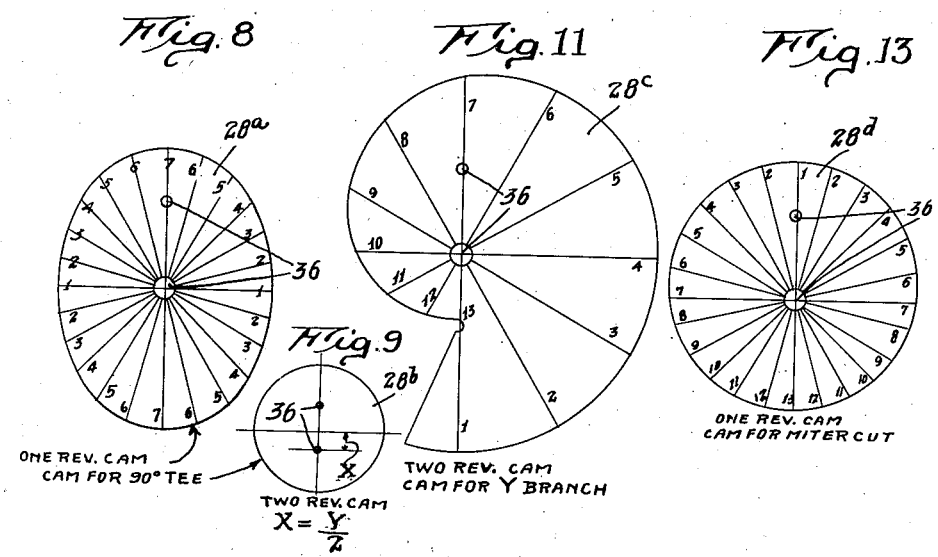
Inventor
Frank J. Douglass
By Lyon & Lyon
Attorneys Patented Feb. 1, 1949

2,460,412

UNITED STATES PATENT OFFICE 2,460,412

APPARATUS FOR FLAME CUTTING

Frank J. Douglass, Pasadena, Calif.

Application October 7, 1942, Serial No. 461,174

4 Claims. (Cl. 33—21)

This invention relates to a method and apparatus for flame cutting, and more particularly to a method and apparatus for cutting tubing utilizing a flame of the type produced through the combustion of oxy-acetylene gas or other similar gas mixtures.

The art of flame cutting has heretofore been considerably developed. The utilization of flame cutting in the fabrication of welded structures has been long employed in the welding art. However, when fabrication of structures employing relative thin-wall, small-diameter tubing became widespread, the problem was immediately presented in cutting off such tubing to different shapes and sections required for subsequent welding.

The difficulty encountered in the flame cutting of relatively thin-walled, small-diameter tubing utilizing the methods of flame cutting is that the heat incident to such flame cutting is usually sufficient to burn material of the tubing, preventing the formation of a sharp cut, or cuts, as are required for the subsequent welding of such cut tube sections.

It is therefore an object of this invention to provide a method and apparatus for the flame cutting of tubular structures, particularly those of small diameters and having relatively thin walls.

Another object of this invention is to provide a method of flame cutting applicable for the continuous cutting of predetermined sections in a cutting off operation of a tube or rod wherein complex cut-offs may be formed utilizing a simple guide cam subject to multiple operation in order to carry out the complete cut-out of the required section.

Other objects and advantages of this invention it is believed will be apparent from the following detailed description of a preferred embodiment thereof as illustrated in the accompanying drawings.

In the drawings:

Figure 7 is a view illustrating the development of a 90° T template.

Figure 8 is a view of the one-revolution cam embodied in my invention for making the cut incident to the production of the 90° welded T.

Figure 9 is a view of a two-revolution cam developed for the production of a 90° T.

Figure 10 is a view illustrating the development of a Y branch template.

Figure 11 is a view of the two-revolution cam developed for the cutting of a pipe for the Y branch connection.

Figure 12 is a view illustrating the development of a miter template.

Figure 13 is a view of a one-revolution cam developed to produce a miter cut.

Figure 1:
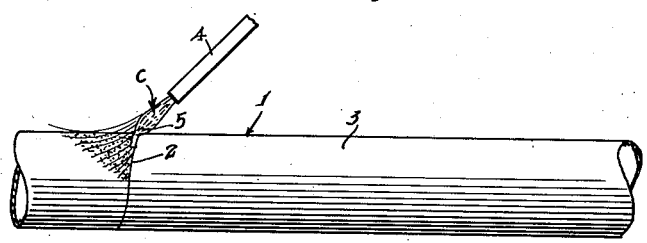
Figure 1 is a diagrammatic illustration of the method embodied in my invention illustrating the method of transferring the heat at the point of cut-off to the waste material cut away enabling the formation of a cut-off to a predetermined pattern without burning the material.
Figure 2:
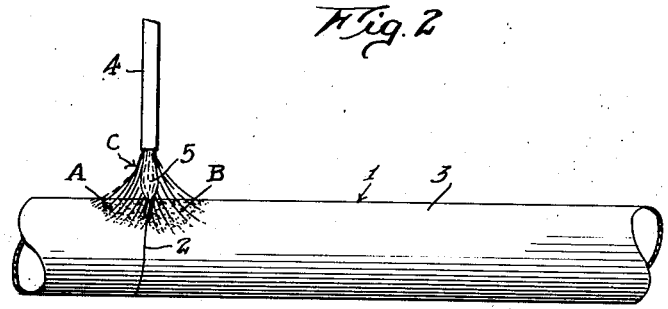
Figure 2 is a diagrammatic illustration illustrating the effect of attempting a cut-off in a thin sheet material where the burning effect and the heat produced by the flame is not transmitted to the waste material of the cut.
Figure 3:
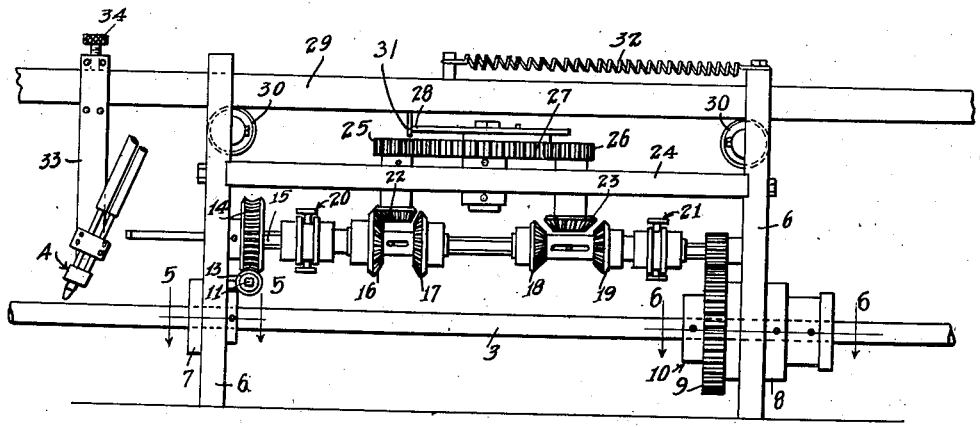
Figure 3 is an elevation of a flame cutting apparatus embodying my invention.
Figure 4:
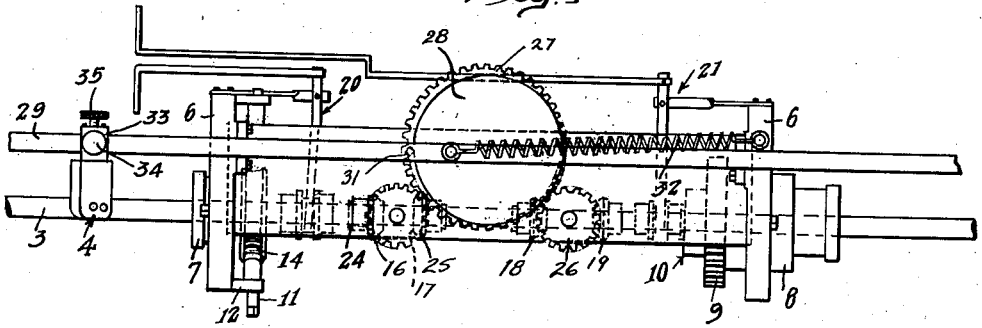
Figure 4 is a top plan view of the structure illustrated in Figure 3.
Figure 5:
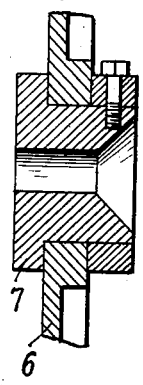
Figure 5 is a fragmental sectional view taken substantially on the line 5—5 of Figure 3.
Figure 6:
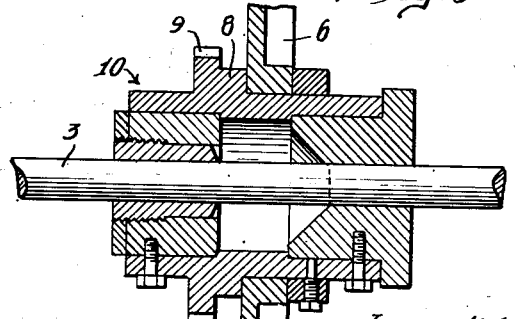
Figure 6 is a fragmental sectional view taken substantially on the line 6—6 of Figure 3.

Many attempts have been made to develop a method for the flame cutting of relatively thin-walled, small-diameter steel or like metal tubing and as far as I have been able to ascertain, these developments have followed the line, or have attempted to utilize the method, illustrated in Figure 2, that is, of making the cut at an angle of 90°, or substantially vertical to the surface to be cut. In thick-walled pipe, for example, of tubing with the wall thickness of approximately $\frac{1}{16}$" or greater, this method may be carried out satisfactorily as neither side of the cut formed will show appreciable burning. When thin walled tubing of $\frac{3}{32}$" or less, however, is attempted to be cut by this method, the edge of the cut on both sides will be burned, as illustrated at A and B in Figure 2, and the result will be that it is impossible to follow a pattern in producing a cut-off satisfactory for welding because the edges of the pipe at such cut-off will be burned and pitted to such an extent that satisfactory welding cannot be performed without a prohibitive amount of filing or grinding of the edge to reproduce the desired pattern. With my invention as illustrated in Figure 1 with respect to such thin-walled pipes as by utilization of this method, I am able to transfer the burning effect created by the flame C to the portion of the thin-walled pipe I which is to be cut off and to which the burning effect may be transferred while still permitting me to follow a pattern desired for such cut as indicated, for example, by the line 2 of the desired finished section of pipe 3.

I have found that the entire burning effect may be transferred to the waste or cut off portion 1 of the pipe by proper inclination of the flame C with respect to the longitudinal axis of the pipe 1 so that the heat and burning effect created by the flame C is all, as far as deleterious effects are concerned, transferred to the said waste portion of the pipe.

In order to determine the correct angle at which the flame C is to be set in order to accomplish this result, I have found that it is only necessary to set up the apparatus to set the flame to approximately the desired angle by inclining the torch or flame nozzle 4 making a test burning and if it is observed that the burning occurs on both sides of the cut, to further incline the torch to the point where all visible burning occurs on one side of the cut, this side being the side occupied by the portion of the pipe to be cut off or away from the pattern line 2.

There are many variables which determine the correct angle for such a flame C among which are the adjustment of the flame itself so that the correct flame tip 5 is produced to effect the maximum efficiency of burn-off. Another variable which prevents an exact statement of the correct degree of angle is the composition of the steel of which the pipe is constructed.

Another variable is the thickness of the steel wall of the pipe and as this thickness diminishes, the angle of inclination of the flame C toward the axis of the pipe must decrease.

Another variable is the diameter of the pipe because the angle at which the flame C is set must be such as to avoid any possibility of the flame C burning through the pipe to burn the opposite wall thereof.

Other variables are the type of gas used to produce the flame as different gases produce different flame temperatures as well as other different pressures of gas and oxygen produce different effects of heat splash and consequent burning. The cutting speed is also determinative of the angle at which the flame C must be set. The higher the cutting speed, the more nearly the vertical may be approached.

In the experiments which I have conducted, however, I have found that the only satisfactory criterion for determining the correct angle for the flame C is by making a test cut with the flame set at an angle and then increasing or decreasing the angle of inclination of the flame at just that point where all visible burning of the steel or metal of the pipe is transferred to the side of the cut, away from the side at which the finished cut is desired, and when this condition is reached, I have found that I am enabled to cut a very thin-walled, small-diameter tube to produce a finished cut-off which will follow accurately a preconceived pattern for such a cut-off. I have found, however, that it is practically impossible to control the position of the flame C and to regulate with a sufficient degree of accuracy the speed of such cut manually and I have therefore developed a machine which enables me to perform this flame cutting operation with the flame set to the desired angle at a uniform rate of speed and which will enable me to follow any predetermined pattern of cut as may be required for the making of any type of welded connection between pipe sections.

The apparatus which I have developed for this purpose may be as herein illustrated. This apparatus includes a frame 6 supporting a pair of journals 7 and 8 within which the tube 3 to be cut off is supported. The journal 8 is provided with gear teeth 9 and a chuck 10 enabling the tube 3 to be held from relative rotation with reference to the gear 9.

Means are provided for rotating the tube 3 which, as herein illustrated, include means for driving the tube in either direction of rotation and at more than one speed. This drive means as herein illustrated includes a driving shaft 11 which may be driven from any suitable type of motor (not shown). The driving shaft 11 is supported in suitable bearings 12 and has secured thereto a worm 13 adapted to mesh with the worm wheel 14 secured to the transmission shaft 15. Splined on the transmission shaft 15 are the transmission gears 16, 17, 18 and 19. Shifter means 20 and 21 are provided for shifting the position of these gears which are mounted in pairs, i. e., the gears 16 and 17 in one pair, the gears 18 and 19 in the other pair. The gears 16 and 17 are of one diameter and are adapted to selectively drive the pinion 22 at one speed as, for example, at the ratio of two to one, while the gears 18 and 19 are adapted to be selectively meshed with a pinion 23 to provide a different ratio as, for example, one to one.

The gears 16 and 17 are supported upon a common sleeve with the shifter 20 and are of the internal beveled type, either one of which is adapted to mesh with the pinion 22, thus providing for a forward and reverse drive of the pinion 22. The same structure is utilized in connection with the internal bevel gears 18 and 19 in their association with the pinion 23.

Mounted in the frame 6 is a plate 24 in which the shafts carrying the pinions 22 and 23 are journaled. The shafts carry at their opposite end gears 25 and 26 which are in mesh with the cam gear 27. The cam gear 27 is likewise supported on the plate 24. The cam gear 27 is adapted to removably receive the cam plates or templates 28.

Mounted in the frame 6 so as to be movable relative thereto is a slide bar 29 which carries at one end the torch 4. The slide bar 29 is supported on rollers 30 in the frame 6 so as to be freely movable and is held in position where the cam pin 31 is urged against the cam or template 28 by means of a spring 32.

The torch 4 is held at the end of the slide bar 29 on a bracket 33 which provides for the pivotal movement or adjustment of the position of the torch so that it may be accurately aligned in a vertical plane passing through the axis of the pipe 3 and may also have its angle of inclination with reference to the axis adjusted.

The bracket 33 is also adjustably supported on the slide bar 29 by means of the thumb screw 34 so that its position along the slide bar 29 may be adjusted. A thumb screw 35 is provided for adjustment of the angularity of the torch 4 while the position of the torch 4 with reference to the plane of the axis may be determined by moving the torch bracket in and out on the rod upon which it is supported on the bracket 33.

The cams or templates 28 are formed in accordance with the type of cut-off desired at the end of the tube 3 and several such types I have illustrated in Figures 7 to 13, inclusive. In these figures I have illustrated the single rotational template or cam as well as the reversing or double rotation cams. In Figure 7 I have illustrated the development of the cam or template 28a for the formation on the end of the pipe of a connection to form a T at right angles with the pipe and have illustrated in Figures 8 and 9 this template or cam of two forms. At 28ª I have illustrated a one-revolution form of cam generated as illustrated in Figure 7. In Figure 9 at 28ᵇ I have illustrated a cam for a double rotation wherein with the gears 16 and 22 in mesh the cam is rotated twice for each rotation of the pipe 3. This enables me to form a simple cam which is positioned upon the cam holder eccentrically as is determined by the holes 36 and where the distance X (i. e. of eccentricity) is equal to half the distance Y (Figure 7).

In Figure 10 I have illustrated the development of a reversing cam or template 28ᶜ for the cutting off of the pipe 3 for the formation of a Y branch. In the use of this cam the same is mounted on the cam holder and the gears 16 and 17 are shifted with relation to the pinion 22 so that when the cam has completed one complete revolution, the gears 16 and 17 are shifted to reverse the direction of rotation, thereby completing the movement of the torch 4 during a single rotation of the tube 3. The use of this type of cam or template and this method of operation permits me to use relatively simple forms of cams or templates to form complex cut-offs in the pipe or tube which operations could not be performed automatically in a continuous operation without a similar method of operation.

In Figures 12 and 13 I have illustrated the formation of a simple one-revolution cam for the formation of a miter cut at the end of the tube 3, such a cam being illustrated at 28ᵈ.

Having fully described my invention, it is to be understood that I do not wish to be limited to the details herein set forth, but my invention is of the full scope of the appended claims.

I claim:

1. In the apparatus of the class described, the combination of a frame, a work supporting means carried by the frame, means for revolving the work support to rotate the work, a tool support, a reciprocating carriage for the tool support mounted to reciprocate on the frame in a direction parallel to the axis of rotation of the work, a pattern template, means driven by the work rotating means for rotating the template, a pin carried by the carriage to engage the pattern template, spring means for yieldably urging the carriage to maintain the pin in contact with the pattern periphery of the template whereby the carriage is reciprocated in accordance with the contour of the pattern periphery of the template as the work is revolved.

2. In the apparatus of the class described, the combination of a frame, a work supporting means carried by the frame, means for revolving the work support to rotate the work, a tool support, a reciprocating carriage for the tool support mounted to reciprocate on the frame in a direction parallel to the axis of rotation of the work, a pattern template, means driven by the work rotating means for rotating the template, a pin carried by the carriage to engage the pattern template, means for yieldably urging the carriage to maintain the pin in contact with the pattern periphery of the template whereby the carriage is reciprocated in accordance with the contour of the pattern periphery of the template as the work is revolved, and means within the drive connection from the work revolving means to the template for reversing the direction of rotation of the template.

3. In a device of the class described, the combination of a frame, means on the frame for rotatably supporting a work piece, drive means including a transmission shaft for revolving the work piece, a tool support, a carriage for the tool support mounted to reciprocate on the frame in a direction parallel to the axis of rotation of the work piece, a pattern template, means driven from said transmission shaft for rotating the template, said means including a dual transmission means selectively operable having different speed ratios, a follower element mounted on the carriage adapted to cooperate with the template, and means for rotating the transmission shaft whereby the carriage is reciprocated in accordance with the template periphery as the work piece is revolved.

4. In a device of the class described, the combination of means for rotatably supporting a work piece, means including a transmission shaft for rotating the work piece, a frame, a carriage mounted to reciprocate on the frame in a direction parallel to the axis of rotation of the work piece, a tool support on the carriage, a pattern template rotatably mounted on the frame, a primary drive means driven from the transmission shaft for rotating the template at one speed, secondary drive means driven from the transmission shaft for rotating the template at another speed, clutch means selectively operable for engaging either the primary or secondary drive means, a follower element on the carriage adapted to cooperate with the template, and means to rotate the transmission shaft whereby the carriage is reciprocated in accordance with the template periphery as the work piece is revolved.

FRANK J. DOUGLASS.

REFERENCES CITED

The following references are of record in the file of this patent:

UNITED STATES PATENTS

| Number | Name | Date |
|---|---|---|
| 134,498 | Von-Hofe | Dec. 31, 1872 |
| 1,242,243 | Rose | Oct. 9, 1917 |
| 1,248,145 | Maynard | Nov. 27, 1917 |
| 1,267,836 | Arnold | May 28, 1918 |
| 1,525,721 | Coberly | Feb. 10, 1925 |
| 1,542,887 | Irvin et al. | June 23, 1925 |
| 1,799,612 | Coberly | Apr. 7, 1931 |
| 1,906,279 | Natlis | May 2, 1933 |
| 1,907,957 | Gerber | May 9, 1933 |
| 1,922,529 | Day | Aug. 15, 1933 |
| 1,923,778 | Douglass | Aug. 22, 1933 |
| 2,138,676 | Hull et al. | Nov. 29, 1938 |
| 2,295,229 | McGuire | Sept. 8, 1942 |